United States Patent
Chang et al.

(10) Patent No.: US 8,558,521 B2
(45) Date of Patent: Oct. 15, 2013

(54) OPERATING PHASE NUMBER DEPENDENT COMPENSATION OF A MULTI-PHASE BUCK CONVERTER

(75) Inventors: Wei-Hsu Chang, Jubei (TW);
 Yu-Cheng Lin, Pingtung (TW);
 Yu-Kuang Wu, Zhubei (TW); Dan Chen, Taipei (TW)

(73) Assignee: Richtek Technology Corp., Chupei, Hsinchu (TW)

( * ) Notice: Subject to any disclaimer, the term of this patent is extended or adjusted under 35 U.S.C. 154(b) by 265 days.

(21) Appl. No.: 12/898,910

(22) Filed: Oct. 6, 2010

(65) Prior Publication Data

US 2011/0084673 A1 Apr. 14, 2011

(30) Foreign Application Priority Data

Oct. 12, 2009 (TW) ................................ 98134504 A

(51) Int. Cl.
 *G05F 1/40* (2006.01)
(52) U.S. Cl.
 USPC ......................................................... 323/271
(58) Field of Classification Search
 USPC .................... 323/268, 271, 282–286, 351
 See application file for complete search history.

(56) References Cited

U.S. PATENT DOCUMENTS

| 7,428,159 B2* | 9/2008 | Leung et al. ..................... 363/95 |
| 7,492,134 B2* | 2/2009 | Tang et al. ..................... 323/241 |
| 7,548,048 B2* | 6/2009 | Chang ............................ 323/283 |
| 7,710,174 B2* | 5/2010 | Prodi et al. ..................... 327/172 |
| 7,855,905 B2* | 12/2010 | Leung et al. ..................... 363/95 |
| 8,030,911 B2* | 10/2011 | Nien et al. ..................... 323/283 |
| 8,134,354 B2* | 3/2012 | Tang et al. ..................... 323/283 |
| 8,193,796 B2* | 6/2012 | Tang et al. ..................... 323/283 |
| 2008/0310200 A1* | 12/2008 | Maksimovic et al. .......... 363/65 |

* cited by examiner

*Primary Examiner* — Adolf Berhane
(74) *Attorney, Agent, or Firm* — Muncy, Geissler, Olds & Lowe, PLLC

(57) ABSTRACT

A multi-phase buck converter has a digital compensator to select a set of compensation coefficients depending on the operating phase number of the multi-phase buck converter, or including different compensators for each operation phase number to improve the loop gain bandwidth, transient response and stability of the multi-phase buck converter. The multi-phase buck converter operates with more phase circuits for higher loading and operates with fewer phase circuits for lower loading. The compensation varies with the number of the operated phase circuits so to be adaptive to the operation condition with an optimized control-to-output voltage transfer function.

6 Claims, 10 Drawing Sheets

|       | PM (°) | BW (Hz) |
|-------|--------|---------|
| 1-Phx | 64     | 40k     |
| 2-Phx | 44.2   | 77.5k   |
| 4-Phx | 6.6    | 160k    |

Fig. 4
Prior Art

|  | PM (°) | BW (Hz) |
|---|---|---|
| 1-Phx | 72.6 | 13k |
| 2-Phx | 72.1 | 25k |
| 4-Phx | 64 | 40k |

OPERATING PHASE NUMBER DEPENDENT COMPENSATION OF A MULTI-PHASE BUCK CONVERTER

FIELD OF THE INVENTION

The present invention is related generally to a multi-phase buck converter and, more particularly, to a phase shedding multi-phase buck converter.

BACKGROUND OF THE INVENTION

To satisfy the high power demand, the multi-phase buck converter is used to replace the single-phase one. The benefits brought by the multi-phase buck converter are the high power density, quick transient response and cost efficient for high current solution. However, with different operating phase number, the profile of power efficiency is different. For light load operation, low operating phase number is preferred to increase the power efficiency by eliminating the switching loss. Thus, the down-phase mechanism, so-called "phase-shedding" technique, is used when the loading current becomes lower. Take a four-phase buck converter for example, as shown in FIG. 1, four phase circuits 10 are provided to convert an input voltage Vi to an output voltage Vo, an error amplifier 18 is connected to the output Vo of the multi-phase buck converter to detect the output voltage Vo to generate an error signal EA, an analog-to-digital converter (ADC) 16 is connected to the error amplifier 18 to convert the analog error signal EA into a digital error signal e[n], a digital compensator 14 is connected to the ADC 16 to compensate the digital error signal e[n] to generate a digital error signal e'[n], and according to the compensated digital error signal e'[n], a digital pulse width modulation (DPWM) circuit 12 connected to the digital compensator 14 provides PWM signals PWM1, PWM2, PWM3 and PWM4 to drive the phase circuits 10 respectively. The DPWM circuit 12 may determine the operating phase number, i.e., how many of the phase circuits 10 to be operated with, according to the loading current Io, and then assert one or more of enable signals EN1, EN2, EN3 and EN4 to enable the corresponding phase circuits 10. Therefore, a four-phase buck converter with a phase shedding mechanism could change the operating phase number from one to four depending on the loading to optimize its power efficiency. FIG. 2 is a diagram showing the profile of power efficiency (η) of a four-phase buck converter when operating with different number of phase circuits, in which curves 20, 22, 24 and 26 represent the power efficiency at different loading (Io) in four-phase operation, three-phase operation, two-phase operation and single-phase operation respectively. As can be seen in FIG. 2, when the operating phase number is smaller, the buck converter has better power efficiency at lower loading; on the contrary, when the operating phase number is larger, the buck converter has better power efficiency at higher loading. The DPWM circuit 12 enables more phase circuits 10 for higher loading and enables fewer phase circuits 10 for lower loading. Thus, the phase shedding mechanism of a multi-phase buck converter can improve the power efficiency of the buck converter as the loading becomes low.

However, as the operating phase number changes, the control-to-output voltage transfer function of a multi-phase buck converter also changes. For example, if a multi-phase buck converter has a resonant frequency fc when operating with single phase circuit, the resonant frequency may become 1.414 fc and 2 fc when operating with two phase circuits and fourth phase circuits respectively. In the conventional designs, a multi-phase buck converter has a single digital compensator, such as the one shown in FIG. 1, so the digital compensator is designed based on a single-phase or four-phase control-to-output voltage transfer function.

With a loop gain bandwidth (BW) of 40 KHz and a phase margin (PM) about 60° as the design target, FIG. 3 shows the frequency response of the multi-phase buck converter of FIG. 1 when the digital compensator 14 is a single-phase based design, in which curves 30 and 32 represent the frequency response obtained in single-phase operation, curves 34 and 36 represent the frequency response obtained in two-phase operation, and curves 38 and 40 represent the frequency response obtained in four-phase operation. FIG. 4 shows the phase margin and bandwidth of the multi-phase buck converter in single-phase, two-phase and four-phase operations, respectively, when the digital compensator 14 is a single-phase based design. FIG. 5 shows the frequency response of the same multi-phase buck converter when the digital compensator 14 is a four-phase based design, in which curves 42 and 44 represent the frequency response obtained in single-phase operation, curves 46 and 48 represent the frequency response obtained in two-phase operation, and curves 50 and 52 represent the frequency response obtained in four-phase operation. FIG. 6 shows the phase margin and bandwidth of the multi-phase buck converter in single-phase, two-phase and four-phase operations, respectively, when the digital compensator 14 is a four-phase based design. Referring to FIGS. 3 to 6, if the digital compensator 14 is designed based on a single-phase control-to-output voltage transfer function, there will be insufficient phase margin when the buck converter operates with four phase circuits. On the other hand, if the digital compensator 14 is designed based on a four-phase control-to-output voltage transfer function, the bandwidths for single-phase and two-phase operations reduce, leading to degraded transient response in single-phase operation and in two-phase operation.

Therefore, it is desired a multi-phase buck converter with operating phase number dependent compensation.

SUMMARY OF THE INVENTION

An object of the present invention is to provide a multi-phase buck converter compensated depending on the operating phase number thereof.

According to the present invention, a multi-phase buck converter with operating phase number dependent compensation includes an error amplifier to detect the output voltage of the multi-phase buck converter to generate an analog error signal, an analog-to-digital converter to convert the analog error signal into a digital error signal, a digital compensator to compensate the digital error signal depending on the operating phase number of the multi-phase buck converter, a DPWM circuit to provide one or more PWM signals according to the compensated digital error signal, and a plurality of phase circuits selected to be driven by the one or more PWM signals to convert an input voltage to the output voltage.

According to the present invention, a method for operating phase number dependent compensation of a multi-phase buck converter detects the output voltage of the multi-phase buck converter to generate an analog error signal, converts the analog error signal into a digital error signal, compensates the digital error signal depending on the operating phase number of the multi-phase buck converter, provides one or more PWM signals according to the compensated digital error signal, and drives one or more phase circuits with the one or more PWM signals to convert an input voltage to the output voltage.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which:

FIG. 4 is a diagram showing the phase margin and bandwidth of the buck converter of FIG. 1 in single-phase, two-phase and four-phase operations, respectively, when its digital compensator is a single-phase based design;

FIG. 6 is a diagram showing the phase margin and bandwidth of the buck converter of FIG. 1 in single-phase, two-phase and four-phase operations, respectively, when its digital compensator is a four-phase based design;

DETAILED DESCRIPTION OF THE INVENTION

Figure 1:
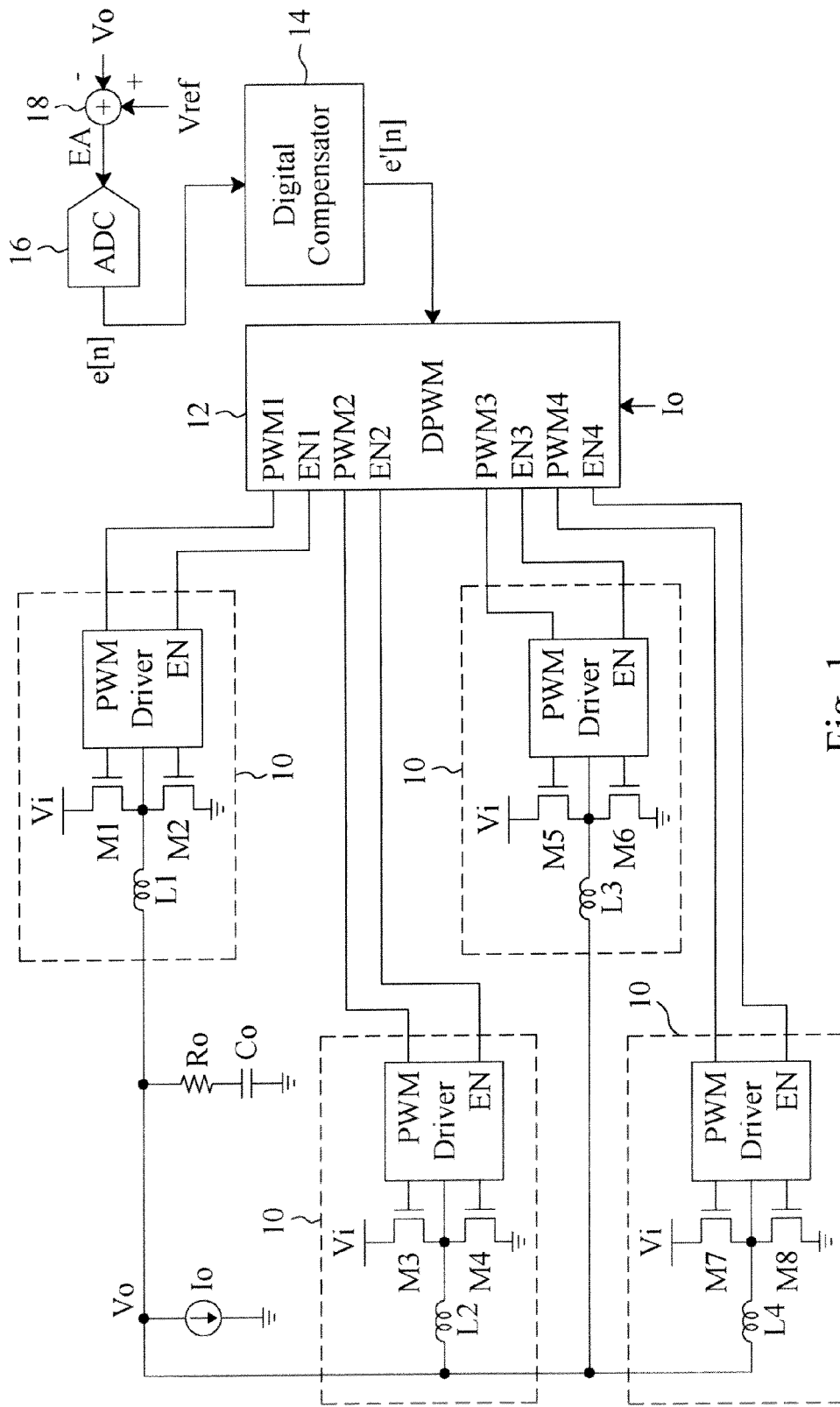
FIG. 1 is a circuit diagram of a conventional digital four-phase buck converter with a phase shedding mechanism.
Figure 2:
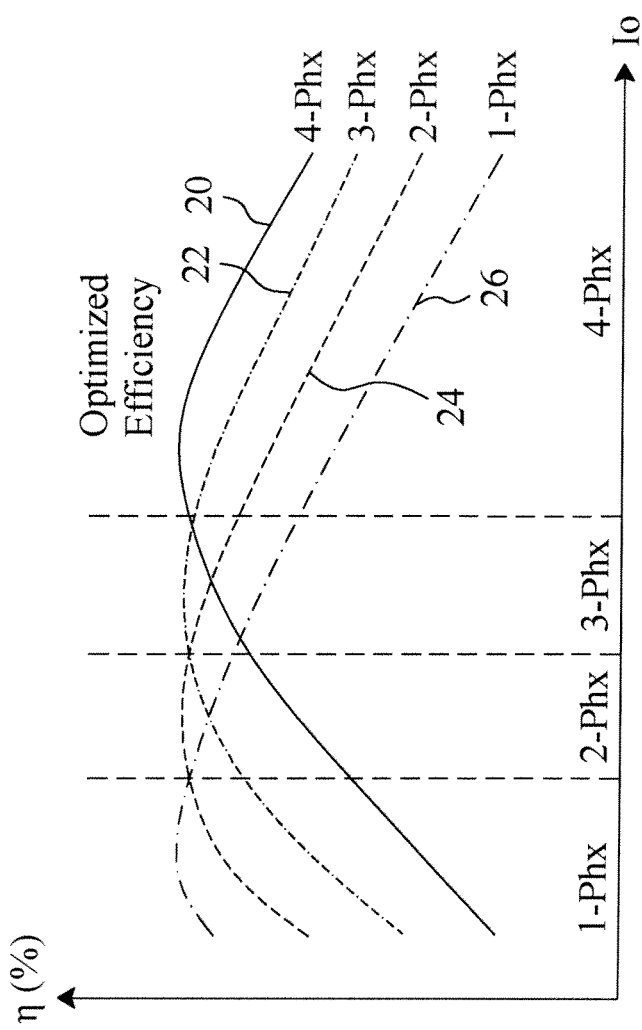
FIG. 2 is a diagram showing the profile of power efficiency of a four-phase buck converter when operating with different phase circuits.
Figure 3:
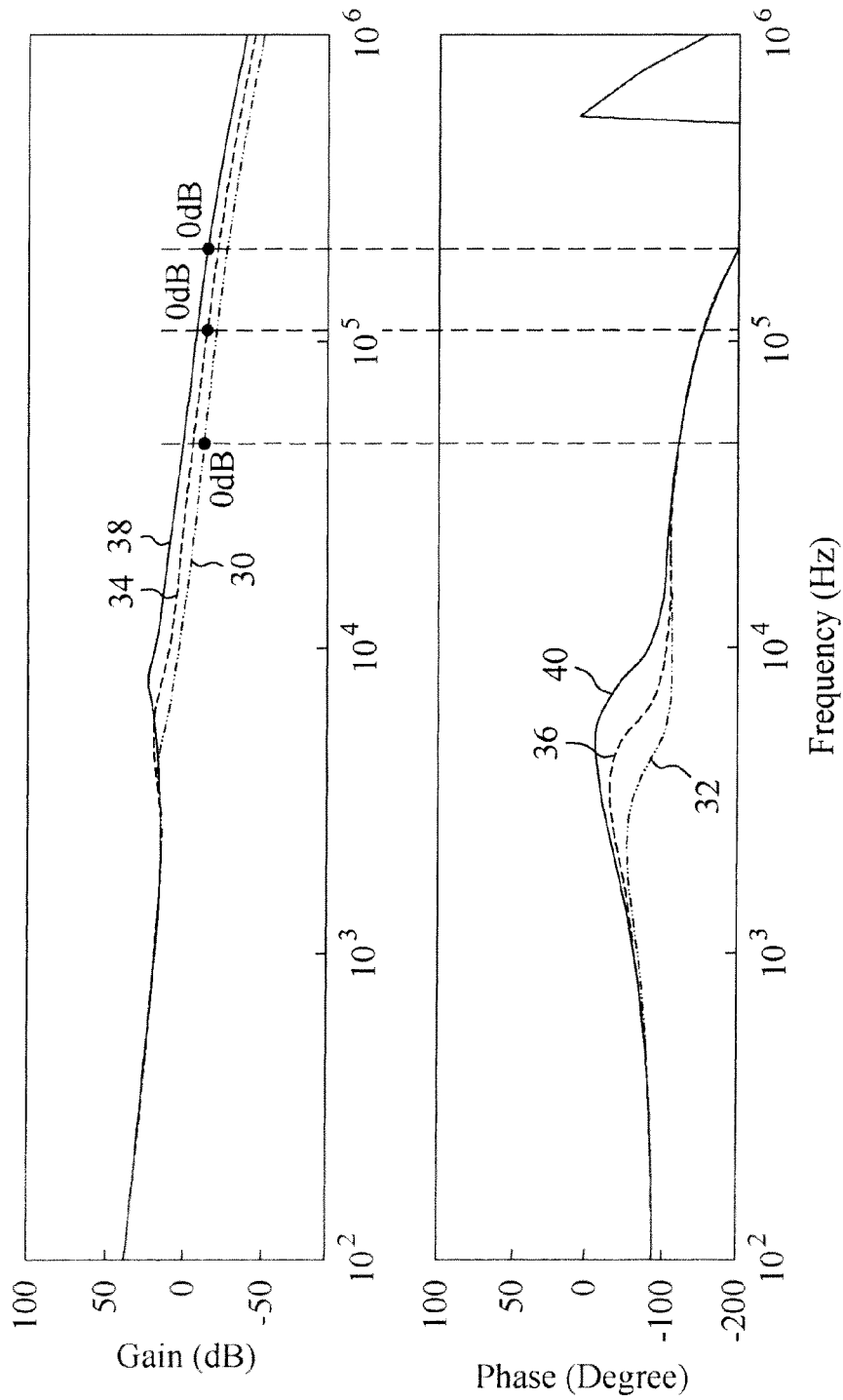
FIG. 3 is a diagram showing the frequency response of the buck converter of FIG. 1 when its digital compensator is a single-phase based design.
Figure 5:
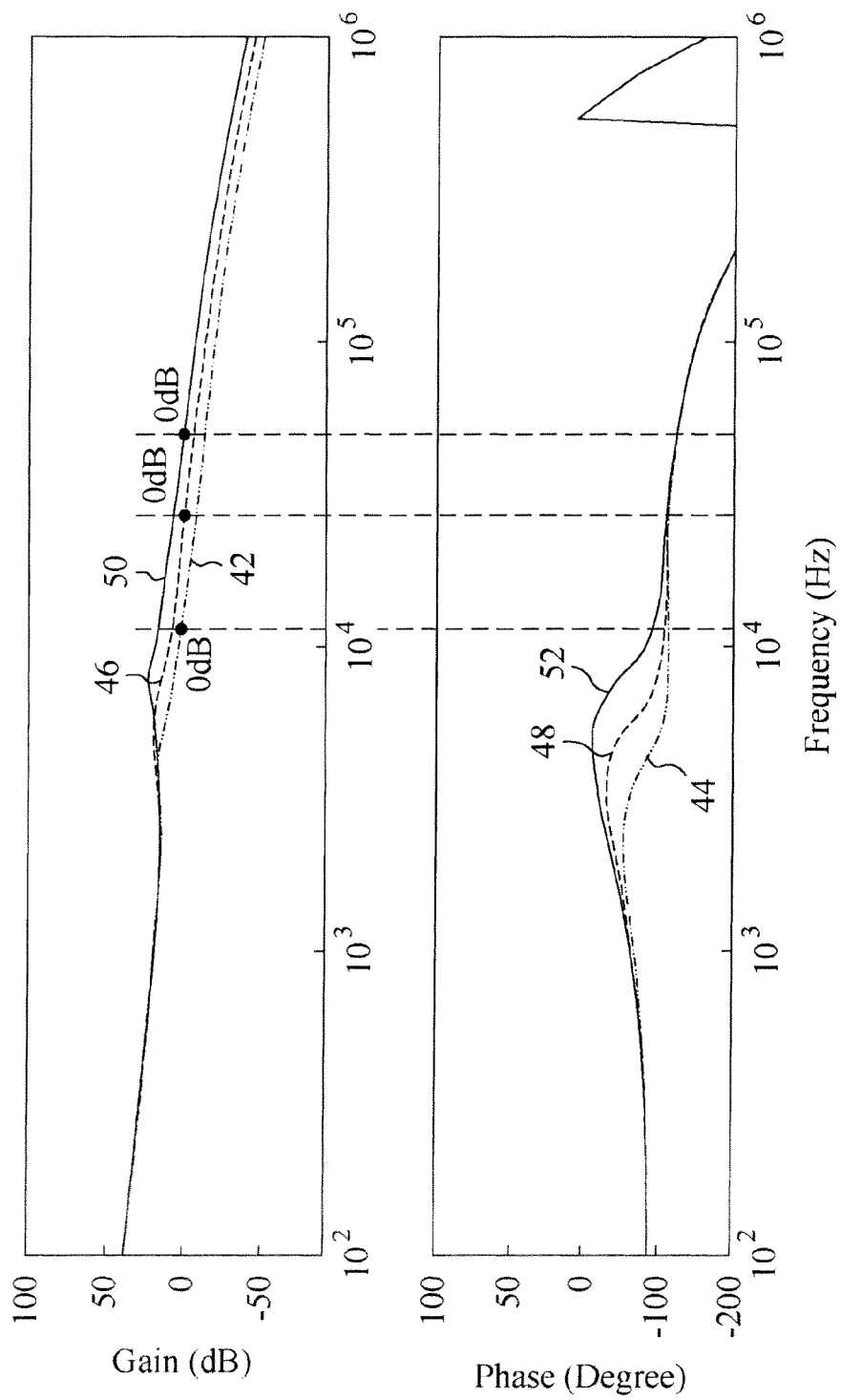
FIG. 5 is a diagram showing the frequency response of the buck converter of FIG. 1 when its digital compensator is a four-phase based design.
Figure 7:
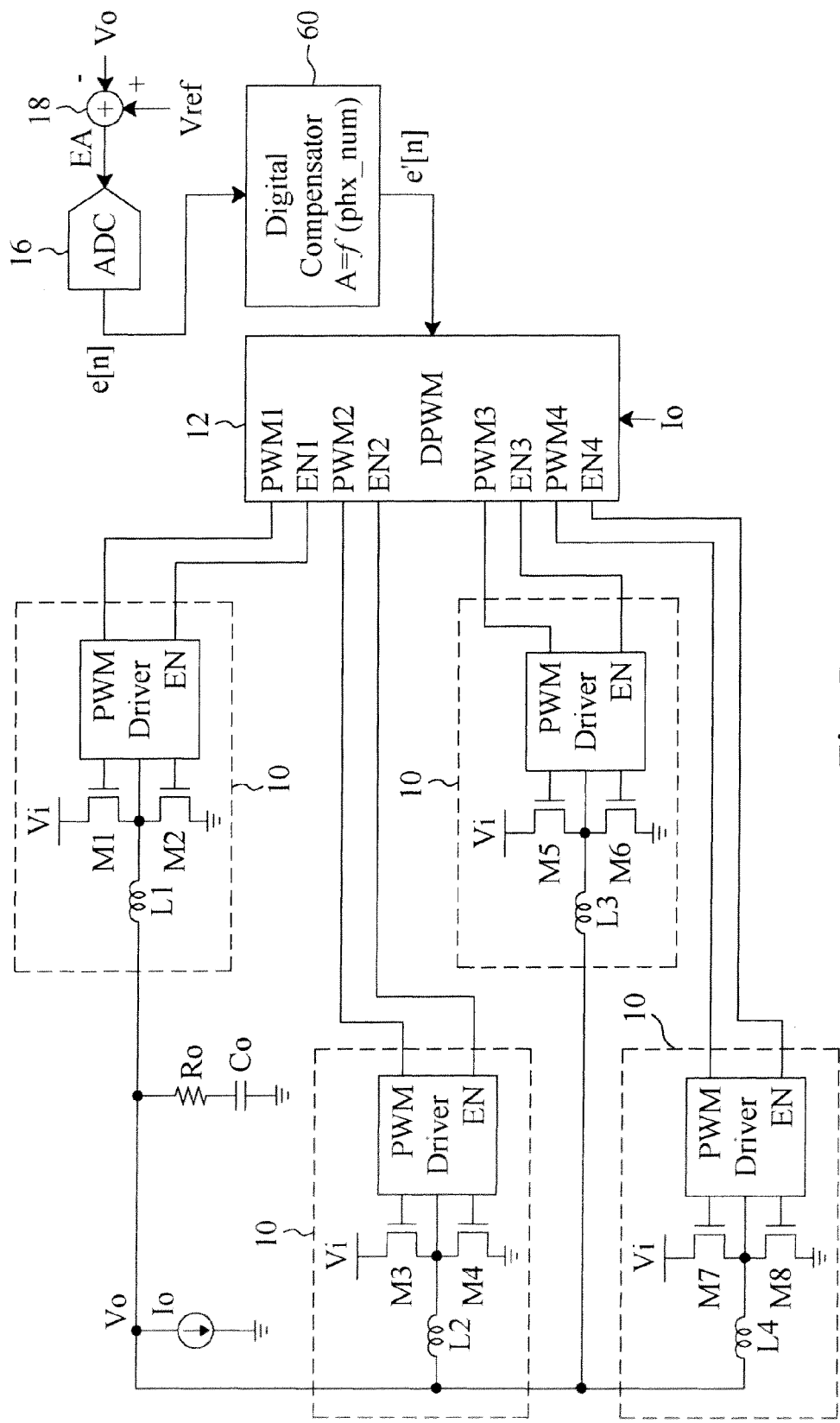
FIG. 7 is a circuit diagram of an embodiment according to the present invention.

For illustrating the scope and features of the present invention, FIG. 7 is a circuit diagram of an embodiment designed based on the digital four-phase buck converter shown in FIG. 1, in which the digital compensator 60 connected between the DPWM circuit 12 and ADC 16 is informed the operating phase number by a phase-number signal phx_num and determines the compensation to the digital error signal e[n] according to the operating phase number, thereby generating an error signal e'[n] suitable for the current operation condition. With different loading, different number of the phase circuits 10 will be used in order to maximize the system's efficiency, and with different operating phase number, different compensation is used to maximize the system's performance. As shown in FIG. 7, the compensation to the digital error signal e[n] depends on the operating phase number, i.e., the compensation coefficient A is a function of the phase-number signal phx_num, A=$f$(phx_num).

Figure 8:
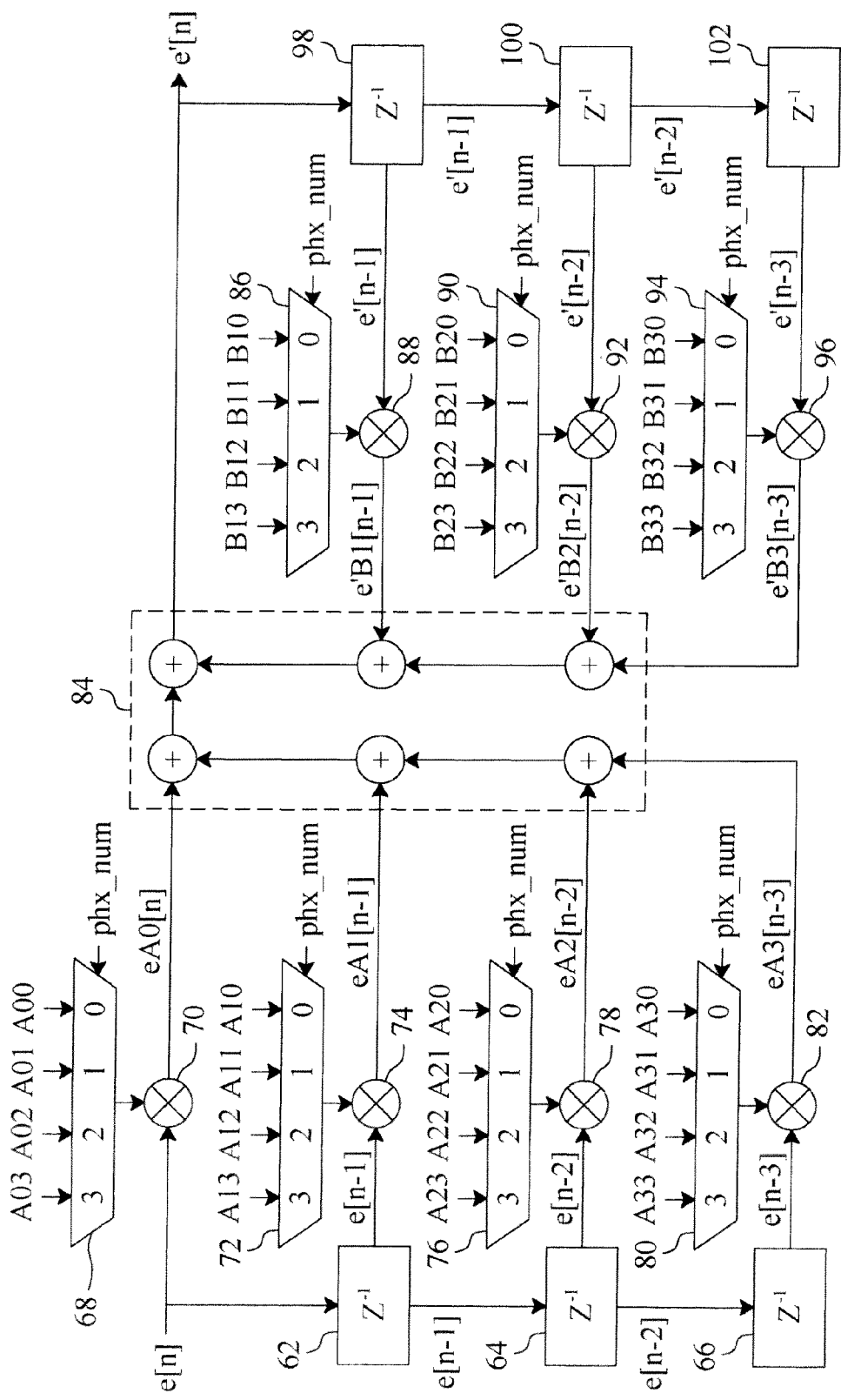
FIG. 8 is a circuit diagram of a first embodiment for the digital compensator shown in FIG. 7.

FIG. 8 is a circuit diagram of a first embodiment for the digital compensator 60 shown in FIG. 7, in which a delay circuit 62 delays the error signal e[n] to generate a signal e[n−1], a delay circuit 64 delays the signal e[n−1] to generate a signal e[n−2], a delay circuit 66 delays the signal e[n−2] to generate a signal e[n−3], a multiplexer 68 selects one from compensation coefficients A00, A01, A02 and A03 according to the phase-number signal phx_num, a multiplier 70 multiplies the compensation coefficient provided by the multiplexer 68 with the error signal e[n] to generate a signal eA0 [n], a multiplexer 72 selects one from compensation coefficients A10, A11, A12 and A13 according to the phase-number signal phx_num, a multiplier 74 multiplies the compensation coefficient provided by the multiplexer 72 with the signal e[n−1] to generate a signal eA1[n−1], a multiplexer 76 selects one from compensation coefficients A20, A21, A22 and A23 according to the phase-number signal phx_num, a multiplier 78 multiplies the compensation coefficient provided by the multiplexer 76 with the signal e[n−2] to generate a signal eA2[n−2], a multiplexer 80 selects one from compensation coefficients A30, A31, A32 and A33 according to the phase-number signal phx_num, a multiplier 82 multiplies the compensation coefficient provided by the multiplexer 80 with the signal e[n−3] to generate a signal eA3[n−3], a delay circuit 98 delays the error signal e'[n] to generate a signal e'[n−1], a delay circuit 100 delays the signal e'[n−1] to generate a signal e'[n−2], a delay circuit 102 delays the signal e'[n−2] to generate a signal e'[n−3], a multiplexer 86 selects one from compensation coefficients B10, B11, B12 and B13 according to the phase-number signal phx_num, a multiplier 88 multiplies the compensation coefficient provided by the multiplexer 86 with the signal e'[n−1] to generate a signal e'B1 [n−1], a multiplexer 90 selects one from compensation coefficients B20, B21, B22 and B23 according to the phase-number signal phx_num, a multiplier 92 multiplies the compensation coefficient provided by the multiplexer 90 with the signal e'[n−2] to generate a signal e'B2[n−2], a multiplexer 94 selects one from compensation coefficient B30, B31, B32 and B33 according to the phase-number signal phx_num, a multiplier 96 multiplies the compensation coefficient provided by the multiplexer 94 with the signal e'[n−3] to generate a signal e'B3[n−3], and an adder circuit 84 combines the signals eA0 [n], eA1[n−1], eA2[n−2], eA3[n−3], e'B1[n−1], e'B2[n−2] and e'B3[n−3] to generate the error signal e'[n]. In this embodiment, different set of coefficients is loaded as the change of the operating phase number.

Figure 9:
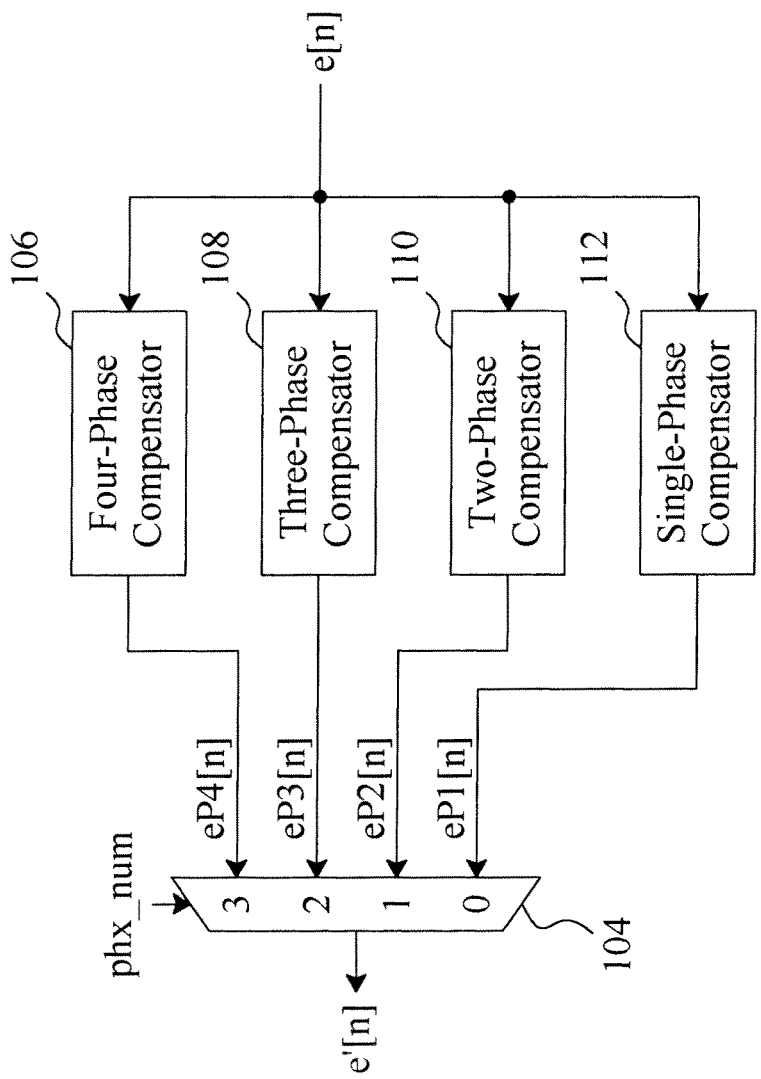
FIG. 9 is a circuit diagram of a second embodiment for the digital compensator shown in FIG. 7.

FIG. 9 is a circuit diagram of a second embodiment for the digital compensator 60 shown in FIG. 7, which includes a multiplexer 104, a four-phase compensator 106, a three-phase compensator 108, a two-phase compensator 110 and a single-phase compensator 112. Each of the compensators 106, 108, 110 and 112 is designed for a specific operating phase number; namely, the four-phase compensator 106 is designed based on a control-to-output voltage transfer function for four-phase operation, the three-phase compensator 108 is designed based on a control-to-output voltage transfer function for three-phase operation, the two-phase compensator 110 is designed based on a control-to-output voltage transfer function for two-phase operation, and the single-phase compensator 112 is designed based on a control-to-output voltage transfer function for single-phase operation. According to the phase-number signal phx_num, the multiplexer 104 selects one from the outputs eP4[n], eP3[n], eP2[n] and eP1[n] of the compensators 106, 108, 110 and 112 as the compensated digital error signal e[n] for the DPWM circuit 12.

Figure 10:
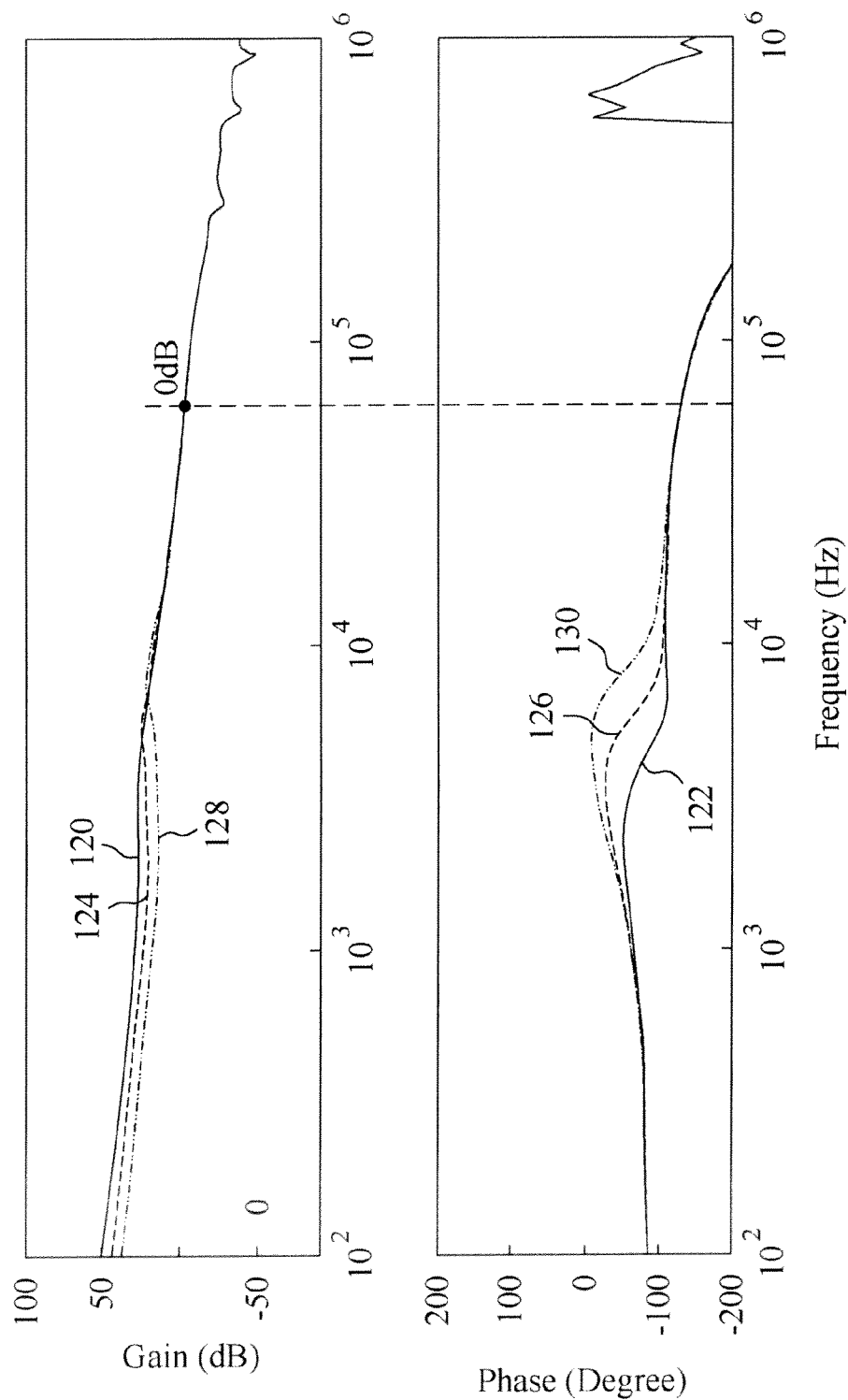
FIG. 10 is a diagram showing the simulated frequency response of the buck converter of FIG. 7 in four-phase operation, two-phase operation and single-phase operation.

FIG. 10 is a diagram showing the simulated frequency response of the buck converter of FIG. 7 in four-phase operation, two-phase operation and single-phase operation, in which curves 120 and 122 represent the frequency response obtained in single-phase operation, curves 124 and 126 represent the frequency response obtained in two-phase operation, and curves 128 and 130 represent the frequency response obtained in four-phase operation. As clearly shown in FIG. 10, when the gain is 0 dB, the curves 120, 124 and 128 are almost overlapped to each other, and the curves 122, 126 and 130 are also almost overlapped to each other. In other words, the buck converter of FIG. 7 has the consistent frequency and phase margin no matter in four-phase, two-phase or single-phase operation.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A multi-phase buck converter with operating phase number dependent compensation, comprising:
    an error amplifier connected to an output of the multi-phase buck converter for detecting an output voltage of the multi-phase buck converter to generate an analog error signal;
    an analog-to-digital converter connected to the error amplifier for converting the analog error signal into a digital error signal;
    a digital compensator connected to the analog-to-digital converter for compensating the digital error signal according to a phase-number signal representative of a number of operating phases of the multi-phase buck converter;
    a DPWM circuit connected to the digital compensator for providing a plurality of PWM signals according to the compensated digital error signal; and
    a plurality of phase circuits connected in parallel between the output of the multi-phase buck converter and DPWM circuit for converting an input voltage to the output voltage, each of the plurality of phase circuits being selected by the DPWM circuit to be driven by a respective one of the plurality of PWM signals.

2. The multi-phase buck converter of claim 1, wherein the digital compensator comprises:
    a plurality of multiplexers for selecting a set of compensation coefficients according to the phase-number signal; and
    a plurality of multipliers, delay circuits and adders configured to generate the compensated digital error signal from the digital error signal and selected compensation coefficients.

3. The multi-phase buck converter of claim 1, wherein the digital compensator comprises:
    a plurality of specific number of operating phases based compensators connected to the analog-to-digital converter for compensating the digital error signal respectively; and
    a multiplexer connected to the plurality of specific number of operating phases based compensators for selecting one from outputs of the plurality of specific number of operating phases based compensators as the compensated digital error signal.

4. A method for operating phase number dependent compensation of a multi-phase buck converter, comprising the steps of:
    (A) detecting an output voltage of the multi-phase buck converter for generating an analog error signal;
    (B) converting the analog error signal into a digital error signal;
    (C) compensating the digital error signal according to a phase-number signal representative of a number of operating phases of the multi-phase buck converter;
    (D) providing one or more PWM signals according to the compensated digital error signal; and
    (E) driving one or more phase circuits with the one or more PWM signals for converting an input voltage to the output voltage.

5. The method of claim 4, wherein the step (C) comprises the steps of:
    selecting a set of compensation coefficients according to the phase-number signal; and
    computing the digital error signal and the set of compensation coefficients for generating the compensated digital error signal.

6. The method of claim 4, wherein the step (C) comprises the steps of:
    compensating the digital error signal by a plurality of specific number of operating phases based compensators respectively; and
    selecting one from the compensated signals as the compensated digital error signal.

* * * * *